US008622558B2

(12) United States Patent  
Kim (10) Patent No.: US 8,622,558 B2
(45) Date of Patent: Jan. 7, 2014

(54) SECTIONALIZED AND DETACHABLE SIDE VIEW MIRROR FOR A VEHICLE

(76) Inventor: Jongyoung Kim, Yongin (KR)

( * ) Notice: Subject to any disclaimer, the term of this patent is extended or adjusted under 35 U.S.C. 154(b) by 157 days.

(21) Appl. No.: 13/393,262

(22) PCT Filed: Feb. 12, 2010

(86) PCT No.: PCT/KR2010/000897
§ 371 (c)(1),
(2), (4) Date: Feb. 29, 2012

(87) PCT Pub. No.: WO2011/027954
PCT Pub. Date: Mar. 10, 2011

(65) Prior Publication Data
US 2012/0162800 A1    Jun. 28, 2012

(30) Foreign Application Priority Data

Sep. 2, 2009    (KR) .................. 10-2009-0082713

(51) Int. Cl.
*G02B 5/08*    (2006.01)
(52) U.S. Cl.
USPC .......................................... 359/865; 359/871
(58) Field of Classification Search
USPC ................................ 359/841, 850, 871–877
See application file for complete search history.

(56) References Cited

U.S. PATENT DOCUMENTS

| | | | | |
|---|---|---|---|---|
| 3,826,563 A * | 7/1974 | Davis | ............................ | 359/865 |
| 4,268,120 A * | 5/1981 | Jitsumori | ...................... | 359/850 |
| 4,917,485 A * | 4/1990 | Baldwin, Sr. | ................. | 359/864 |
| 5,005,962 A * | 4/1991 | Edelman | ...................... | 359/864 |
| 5,295,021 A * | 3/1994 | Swanson | ...................... | 359/850 |
| 6,247,821 B1 * | 6/2001 | Brewster | ...................... | 359/841 |
| 6,811,288 B2 * | 11/2004 | Hutzel | ......................... | 362/494 |
| 7,052,149 B2 * | 5/2006 | Suzuki et al. | ................. | 359/850 |
| 7,167,294 B2 * | 1/2007 | Lynam et al. | ................. | 359/265 |
| 7,216,993 B2 * | 5/2007 | Murray | ......................... | 359/841 |
| 7,293,888 B2 * | 11/2007 | Hutzel et al. | .................. | 359/871 |
| 2001/0000443 A1 * | 4/2001 | Galicia | ......................... | 359/871 |
| 2003/0081334 A1 * | 5/2003 | Skinner | ........................ | 359/864 |
| 2008/0074768 A1 * | 3/2008 | Yang | ............................ | 359/850 |
| 2011/0051269 A1 * | 3/2011 | Hignight | ...................... | 359/850 |

FOREIGN PATENT DOCUMENTS

| | | |
|---|---|---|
| JP | 02-121450 U | 10/1990 |
| JP | 05-007541 U | 2/1993 |
| KR | 20-1999-0034549 U | 8/1999 |
| KR | 10-0524287 B1 | 10/2005 |

* cited by examiner

*Primary Examiner* — Jennifer L. Doak
(74) *Attorney, Agent, or Firm* — Patent Office of Dr. Chung Park (57) ABSTRACT

Disclosed is a sectionalized and detachable side view mirror assembly for a vehicle. The sectionalized and detachable side view mirror assembly includes: a housing having a hollow section therewithin; a central mirror by which a driver sees the rear side of the vehicle from inside of the vehicle; a lateral mirror by which the driver sees a blind spot in vicinity of the rear side of the vehicle from inside of the vehicle; a lower mirror by which the driver sees a lower rear side of the vehicle from inside of the vehicle; a central mirror mounting part for securing the central mirror within the hollow section of the housing; a lateral mirror mounting part for securing the lateral mirror within the hollow section of the housing; and a lower mirror mounting part for securing the lower mirror within the hollow section of the housing.

5 Claims, 6 Drawing Sheets

SECTIONALIZED AND DETACHABLE SIDE VIEW MIRROR FOR A VEHICLE

CROSS-REFERENCE TO PRIOR APPLICATIONS

This application is a national Stage Patent Application of PCT International Patent Application No. PCT/KR2010/000897, filed on Feb. 12, 2010 under 35 U.S.C. §371, which claims priority of a Korean Patent Application No. 10-2009-0082713, filed on Sep. 2, 2009, which are all hereby incorporated by reference in their entirety.

TECHNICAL FIELD

The present invention relates to a side view mirror assembly for a vehicle, and more particularly to a side view mirror assembly having three mirrors.

DESCRIPTION OF PRIOR ART

In general, a vehicle is attached with a pair of right and left side view mirrors next to A-pillars. A driver watches the right and left sides of the vehicle by using such side view mirrors.

Meanwhile, in a case in which a side view mirror is a flat mirror, a blind spot generally occurs. In order to solve this problem, a curved mirror is used, or an additional auxiliary mirror is provided at the surface of the side view mirror or within a vehicle.

Also, a technology of electromotively tilting a side view mirror downward to view the lower side during backward movement of a vehicle was commercialized.

However, some drivers may want to set a side view mirror in such a manner that the side view mirror is divided into mirrors for a blind spot and backward movement according to their respective driving habits and tastes.

In order to meet this requirement, a left/right or upper/lower divided side view mirror has been developed. Furthermore, an actuator allowing each of divided side view mirrors to be controlled from inside the vehicle has been developed.

However, by the simple division of a side view mirror, it is impossible to sufficiently cope with a driver's taste or a change in a driving environment. In other words, there is a limitation in that it is difficult to replace the side view mirror with another side view mirror having a color or a UV filtering function according to seasons or weathers, or to immediately replace the side view mirror when the side view mirror is damaged (or cracked) by an impact.

Meanwhile, when respective divided side view mirrors are controlled from inside the vehicle, separate remote controls for the respective divided parts as well as a conventional side view mirror remote control are required. Thus, there is a problem in that the operation of a pair of right and left side view mirrors is very troublesome.

DISCLOSURE

Technical Problem

The present invention has been made in view of the above-mentioned problems, and the present invention provides a side view mirror assembly for a vehicle, in which a multi-divided side view mirror can cope with a blind spot and backward movement.

Also, it is another object of the present invention to provide a side view mirror assembly for a vehicle, in which a multi-divided side view mirror can be easily replaced. More particularly, in the side view mirror assembly, two overlapping mirrors having different characteristics are inserted so that the mirrors can be easily replaced as required.

Also, it is a further object of the present invention to provide a side view mirror assembly for a vehicle, in which the respective angles of multi-divided mirrors can be simultaneously adjusted by only a single operation of a remote control.

Other objects of the present invention will be apparent from the embodiments in the following description.

Advantageous Effects

According to the present invention, a driver can freely replace a side view mirror according to his own driving habit and taste, thereby setting the side view mirror with personality.

Especially, since two overlapping mirrors are inserted to each of the center, the lateral side, and the lower side, it is possible to replace one mirror with the other one having a required color, that is, the front mirror with the rear one, according to seasons or weathers without a visit to a car maintenance center. This doubles the convenience.

Furthermore, it is possible to simultaneously adjust the angles of the lateral mirror and the lower mirror by only a single operation, and further to simultaneously adjust the angles of the lateral mirrors and the lower mirrors of left/right side view mirrors by only a single operation. This maximizes the convenience in use.

SUMMARY OF THE INVENTION

The present invention relates to a sectionalized and detachable side view mirror assembly for a vehicle, the sectionalized and detachable side view mirror assembly comprising:
a housing having a hollow section therewithin;
a central mirror by which a driver sees the rear side of the vehicle from inside of the vehicle;
a lateral mirror by which the driver sees a blind spot in vicinity of the rear side of the vehicle from the inside of the vehicle;
a lower mirror by which the driver sees a lower rear side of the vehicle from the inside of the vehicle;
a central mirror mounting part for securing the central mirror within the hollow section of the housing;
a lateral mirror mounting part for securing the lateral mirror within the hollow section of the housing; and
a lower mirror mounting part for securing the lower mirror within the hollow section of the housing,
wherein the central mirror mounting part, the lateral mirror mounting part, and the lower mirror mounting part are integrally formed and insertedly provided in such a manner that the central mirror mounting part, the lateral mirror mounting part, and the lower mirror mounting part cover the hollow section of the housing,
the lateral mirror mounting part is positioned at a lateral side of the central mirror mounting part away from the vehicle, and is inclined with a predetermined angle toward outside of the housing along an outward direction of the vehicle, and
the lower mirror mounting part is positioned below the central mirror mounting part, and is inclined with a predetermined angle toward inside of the housing along a downward direction.

The present invention relates to a sectionalized and detachable side view mirror assembly for a vehicle, the sectionalized and detachable side view mirror assembly comprising:

a housing having a hollow section therewithin, the hollow section being divided into two parts by a sheet-type vertical panel in a vertical direction;

a rectangular central mirror;

a semicircular lateral mirror;

a rectangular lower mirror;

a central mirror mounting part for securing the central mirror within the hollow section of the housing;

a lateral mirror mounting part for securing the lateral mirror within the hollow section of the housing;

a lower mirror mounting part for securing the lower mirror within the hollow section of the housing; and an actuator for adjusting angles of the lateral mirror mounting part and the lower mirror mounting part, wherein the central mirror mounting part comprises a front-side frame, a back panel, and a hinge, wherein the front-side frame has a rectangular opening allowing the central mirror to be exposed to outside, the back panel is fixed within the housing, and has a space between the back panel and the front-side frame to allow the central mirror to be inserted therein, and the hinge is formed at one side end of the front-side frame and the back panel, connects the front-side frame and the back panel to each other, and allows the front-side frame to rotate with a predetermined angle, wherein at one end of the front-side frame, a fastening protrusion is formed which is fastened with the back panel by being forcedly fitted, at a corresponding position of the back panel, a fastening groove fastened with the fastening protrusion is formed to forcedly hold the central mirror inserted within the space through fastening, and a front surface of the front-side frame is coated with a reflective material, the lateral mirror mounting part comprises a front-side frame, a back panel, a hinge, and a spur gear, wherein the front-side frame has a semicircular opening allowing the lateral mirror to be exposed to the outside, the back panel has a space between the back panel and the front-side frame to allow the lateral mirror to be inserted therein, and the hinge is formed at one side end of the front-side frame and the back panel, connects the front-side frame and the back panel to each other, and allows the front-side frame to rotate with a predetermined angle, wherein at one end of the front-side frame, a fastening protrusion is formed which is fastened with the back panel by being forcedly fitted, at a corresponding position of the back panel, a fastening groove fastened with the fastening protrusion is formed to forcedly hold the lateral mirror inserted within the space through fastening, a front surface of the front-side frame is coated with a reflective material, at both lateral ends of the back panel, a rotation shaft is formed which is fixed to an inner surface of the housing and the vertical panel to rotate the back panel with a predetermined angle, and the spur gear is engaged with the actuator to adjust the angle of the back panel during motor-rotation of the actuator, the lower mirror mounting part comprises a front-side frame, a back panel, a hinge, and a spur gear, wherein the front-side frame has a rectangular opening allowing the lower mirror to be exposed to the outside, the back panel is fixed within the housing, and has a space between the back panel and the front-side frame to allow the lower mirror to be inserted therein, and the hinge is formed at one side end of the front-side frame and the back panel, connects the front-side frame and the back panel to each other, and allows the front-side frame to rotate with a predetermined angle, wherein at one end of the front-side frame, a fastening protrusion is formed which is fastened with the back panel by being forcedly fitted, at a corresponding position of the back panel, a fastening groove fastened with the fastening protrusion is formed to forcedly hold the lower mirror inserted within the space through fastening, a front surface of the front-side frame is coated with a reflective material, at both lateral ends of the back panel, a rotation shaft is formed which is fixed to inner upper and lower surfaces of the housing to rotate the back panel with a predetermined angle, and the spur gear is engaged with the actuator to adjust the angle of the back panel during the motor-rotation of the actuator, wherein the central mirror mounting part and the lower mirror mounting part are inserted in such a manner that the central mirror mounting part, and the lower mirror mounting part cover one side hollow section of the vertical panel within the housing, and the lower mirror mounting part is provided below the central mirror mounting part, the lateral mirror mounting part is inserted in such a manner that the lateral mirror mounting part covers the other side hollow section of the vertical panel within the housing, and both the spur gear of the lateral mirror mounting part and the spur gear of the lower mirror mounting part are engaged with the actuator to simultaneously adjust angles of the lateral mirror mounting part and the lower mirror mounting part during the motor-rotation of the actuator.

BRIEF DESCRIPTION OF THE DRAWINGS

The foregoing and other objects, features and advantages of the present invention will become more apparent from the following detailed description when taken in conjunction with the accompanying drawings in which.

BEST MODE

Mode for Invention

Hereinafter, the configuration of a sectionalized and detachable side view mirror assembly for a vehicle, according to a first exemplary embodiment of the present invention, will be described with reference to the accompanying drawings.

Figure 1:
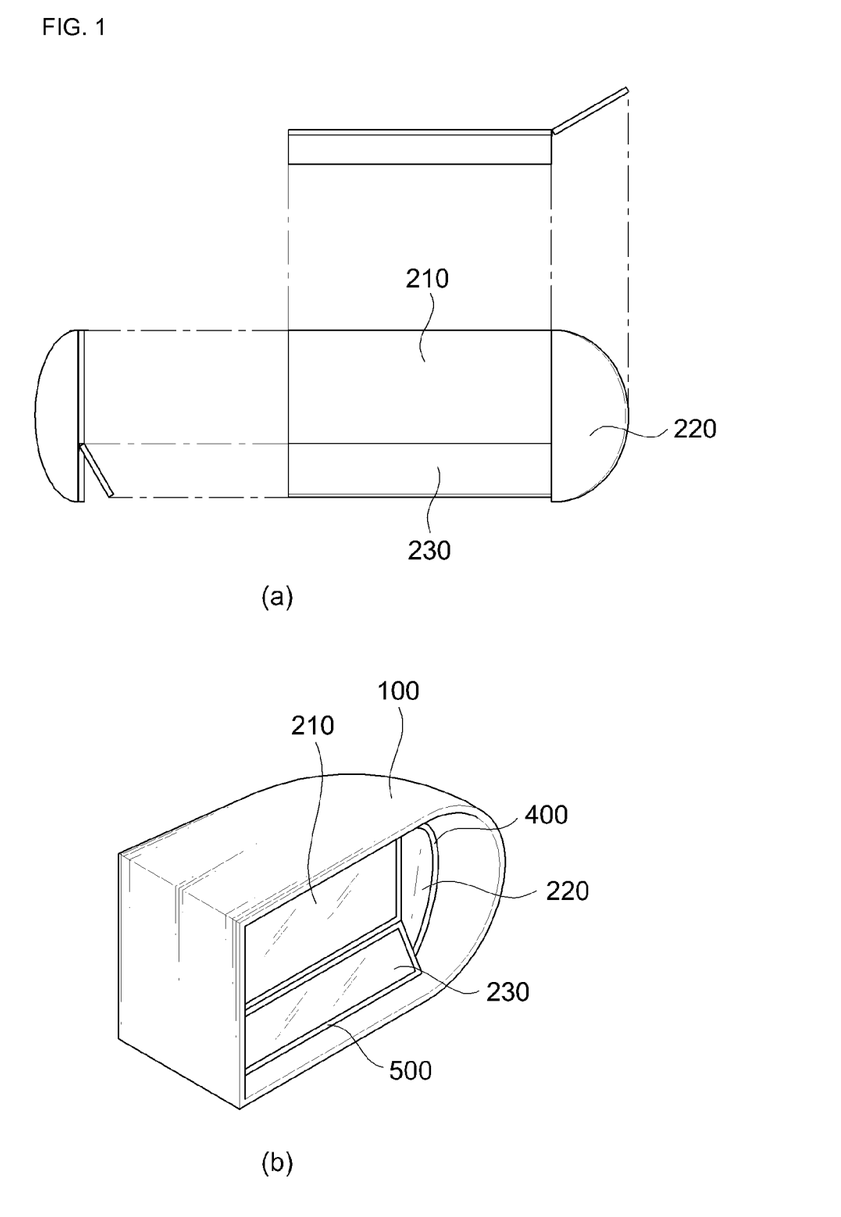
FIG. 1 shows views illustrating the external form of a sectionalized and detachable side view mirror assembly for a vehicle, according to a first exemplary embodiment of the present invention, and the ratios of angles and sizes of mirrors.
Figure 2:
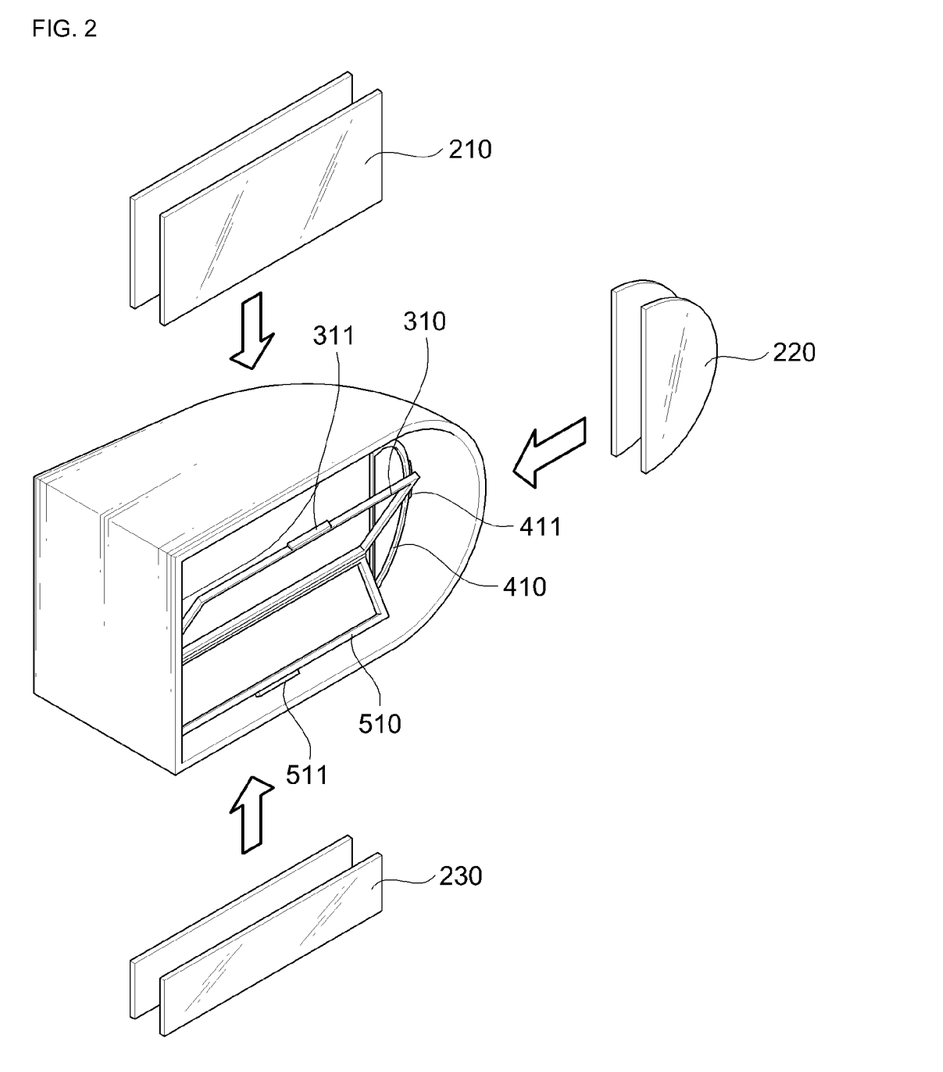
FIG. 2 shows a view illustrating the inserting and mounting of a total of 6 mirrors into a housing.
Figure 3:
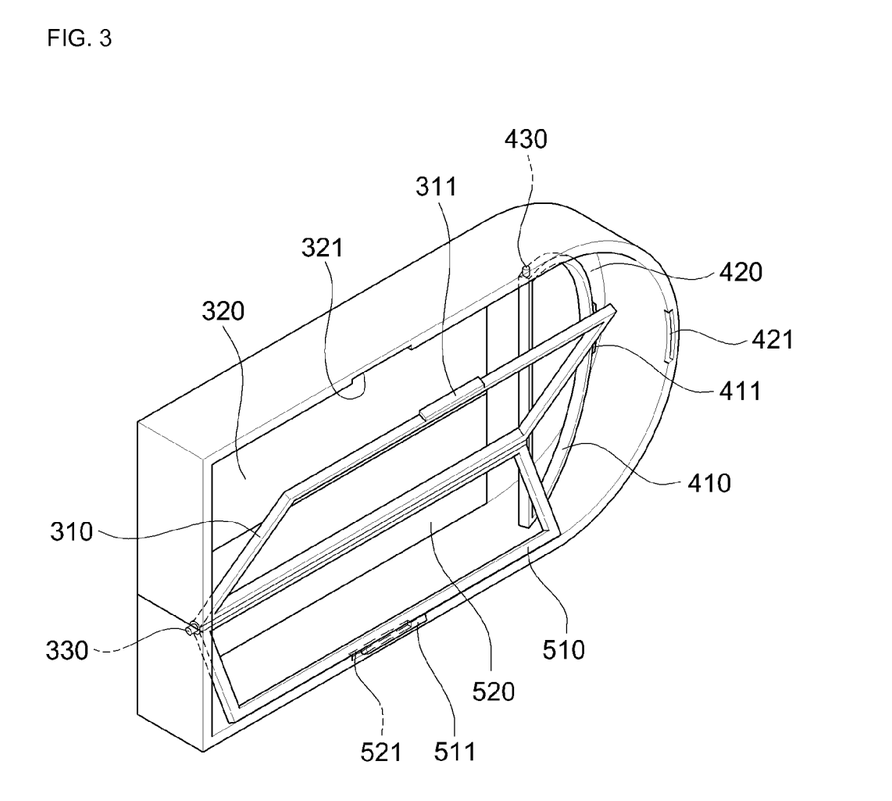
FIG. 3 shows a view illustrating the structure of a mirror mounting part shown in FIG. 1, according to the present invention.

FIG. 1 shows views illustrating the external form of a sectionalized and detachable side view mirror assembly for a vehicle, according to a first exemplary embodiment of the present invention, and the ratios of angles and sizes of mirrors. FIG. 2 shows a view illustrating the inserting and mounting of a total of 6 mirrors into a housing. FIG. 3 shows a view illustrating the structure of a mirror mounting part shown in FIG. 1, according to the present invention.

Referring to FIG. 1a, it can be seen that rectangular shaped mirrors 210 and 230 and a semicircular shaped mirror 220 are arranged with predetermined angles therebetween. In order to clarify the angles between the respective mirrors, FIG. 1a shows side view mirror assemblies in which the upper one is a plan view, the left one is a left-side view, and the center one is a front view.

Meanwhile, FIG. 1b shows a perspective view of the arrangement of such three mirrors, and FIG. 1c shows the state where such three mirrors are mounted within a housing 100.

FIG. 1c shows the external form of a right side view mirror assembly for a vehicle, and hereinafter, the description will be based on the right side view mirror assembly for convenience sake. A left side view mirror assembly, of course, has the same configuration as that of the right side view mirror assembly except for the direction.

Meanwhile, it can be seen that the vehicle side view mirror assembly shown in FIG. 1c includes the housing 100 having a hollow section therewithin, mirror mounting parts 300, 400, and 500 mounted within the housing, and the three mirrors 210, 220, and 230 which are inserted and fixed within mirror mounting parts 300, 400, and 500, respectively.

Herein, the mirror 210 at the upper left side is a central mirror which is used when a driver watches the rear side of the vehicle from the inside of the vehicle, the mirror 230 at the lower left is a lower mirror which is used when the drive watches the rear lower side of the vehicle during the backward movement, and the semicircular mirror 220 at the right side is a lateral mirror which is used to watch the short distance blind spot at the rear side of the vehicle.

As shown in FIG. 2, it can be seen that the mirrors 210, 220, and 230 can be inserted into the inner spaces of front-side frames 310, 410, and 510 of the mirror mounting parts 300, 400, and 500 by opening the frames 310, 410, and 510.

The mirror mounting parts 300, 400, and 500 include hinges 330, 430, and 530 as shown in FIG. 3 so as to open/close the front-side frames 310, 410, and 510. Also, into the inner spaces of the front-side frames 310, 410, and 510, the mirrors 210, 220, and 230 are inserted. Herein, at the back surfaces of the front-side frames 310, 410, and 510, fastening protrusions 311, 411, and 511 are formed. After being fitted by a force, the fastening protrusions 311, 411, and 511 are forcedly fitted in fastening grooves 321, 421, and 521 formed at corresponding positions of back panels 320, 420, and 520 and fix the mirrors 210, 220, and 230 inserted into the inner spaces. In order to securely fix the mirrors 210, 220, and 230, an additional rubber sealing (not shown) may be provided.

Meanwhile, referring to FIG. 2, since the space formed between the back panel 320, 420, and 520 and the front-side frame 310, 410, and 510 corresponds to the thickness of two overlapped mirrors 210, 220, and 230, two overlapped mirrors 210, 220, and 230 are inserted and then the front-side frames 310, 410, and 510 are closed and fixed.

FIG. 3 shows the mirror mounting parts 300, 400, and 500. In the first exemplary embodiment of the present invention, the mirror mounting parts 300, 400, and 500 are integrally fabricated. Preferably, the mirror mounting parts 300, 400, and 500 are made of a plastic material, and are assembled by fastening the three front-side frames 310, 410, and 510 with respect to the hinges 330, 430, and 530 on one integrally injection-molded back panel and are inserted and fixed in such a manner that they completely cover the hollow section within the housing 100.

Meanwhile, the housing 100 is fixedly provided on the lateral surface at the front side of the A pillar of the vehicle. Thus, the driver can open any one of the front-side frames 310, 410, and 510 and replace the mirrors 210, 220, and 230 at any time, that is, before or after he gets into the vehicle.

Herein, an important thing is that the mirror mounting parts 300, 400, and 500 form predetermined angles therebetween. This allows the mirrors 210, 220, and 230 inserted and fixed in the mirror mounting parts 300, 400, and 500 to be fixed with the angles shown in FIG. 1.

In other words, referring to FIG. 3, the lateral mirror mounting part 400 is positioned adjacently to the right side (that is, the outside of the vehicle) with respect to the central mirror mounting part 300, and is slightly curved toward the back of the vehicle. The interior angle formed by the central mirror mounting part 300 and the lateral mirror mounting part 400 ranges from about 175 to 177°, which is lower than 180°. This allows the driver to watch the blind spot through the lateral mirror 220.

Meanwhile, referring to FIG. 3, the lower mirror mounting part 500 is slightly curved toward the inside of the housing 100 with respect to the central mirror mounting part 300. In other words, the angle formed by the central mirror mounting part 300 and the lower mirror mounting part 500 ranges from about 183 to 185°, which is higher than 180°. In other words, the angle of 3 to 5° formed toward the inside of the housing 100 allows the driver to more minutely watch the situation at the lower rear side of the vehicle from the inside of the vehicle.

Meanwhile, the central mirror 210 is mainly used by the driver during the driving of the vehicle, and thus the position and the size of the central mirror 210 are preferably different from those of the lateral mirror 220 and the lower mirror 230. The size of the central mirror 210 is sufficiently secured without any inconvenience in usual driving only when the length (height) ratio of the central mirror 210 to the lower mirror 230 ranges from 7:3 to 8:2, and the breadth (width) ratio of the central mirror 210 to the lateral mirror 220 ranges from 7:3 to 8:2. Also, in the above described ratio range, the sizes of the lateral mirror 220 and the lower mirror 230 are not too small so that they do not interfere with the driving.

Meanwhile, the front-side frame 310, 410, and 510 forms a thin and long frame which allows the surface of the mirror 210, 220, and 230 inserted therein to be easily exposed to the outside. Also, within the front-side frame 310, 410, and 510, a rectangular or semicircular opening is formed. Meanwhile, such a front-side frame 310, 410, and 510 is preferably fabricated in such a manner that its width is as thin and narrow as possible within a limit of hardness capable of sufficiently securing the mirror 210, 220, and 230. Especially, the surface of the front-side frame 310, 410, and 510 is coated with a reflective material so that it does not obstruct the driver's view during the driving.

When the reflective material is not coated, the front-side frames 310, 410, and 510 visually separate the three mirrors 210, 220, and 230 from each other. This not only aggravates confusion, but also narrows the mirror's area itself.

Hereinafter, the configuration of a sectionalized and detachable side view mirror assembly for a vehicle, according to a second exemplary embodiment of the present invention, will be described with reference to the accompanying drawings. The description on structures overlapping those described above will be omitted.

Figure 4:
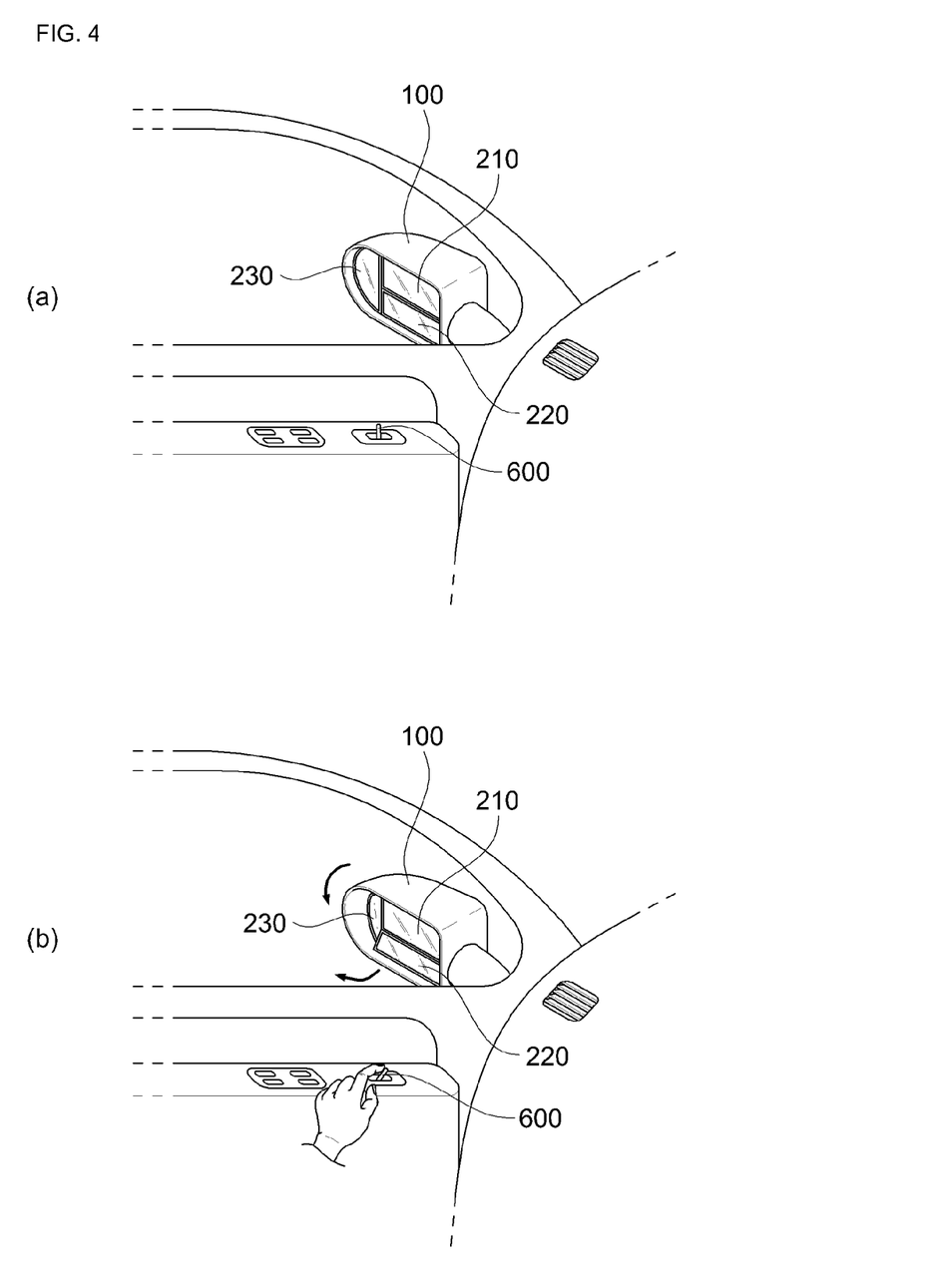
FIG. 4 shows views illustrating the angle adjustment of a three-part side view mirror assembly from the inside, according to a second exemplary embodiment of the present invention.
Figure 5:
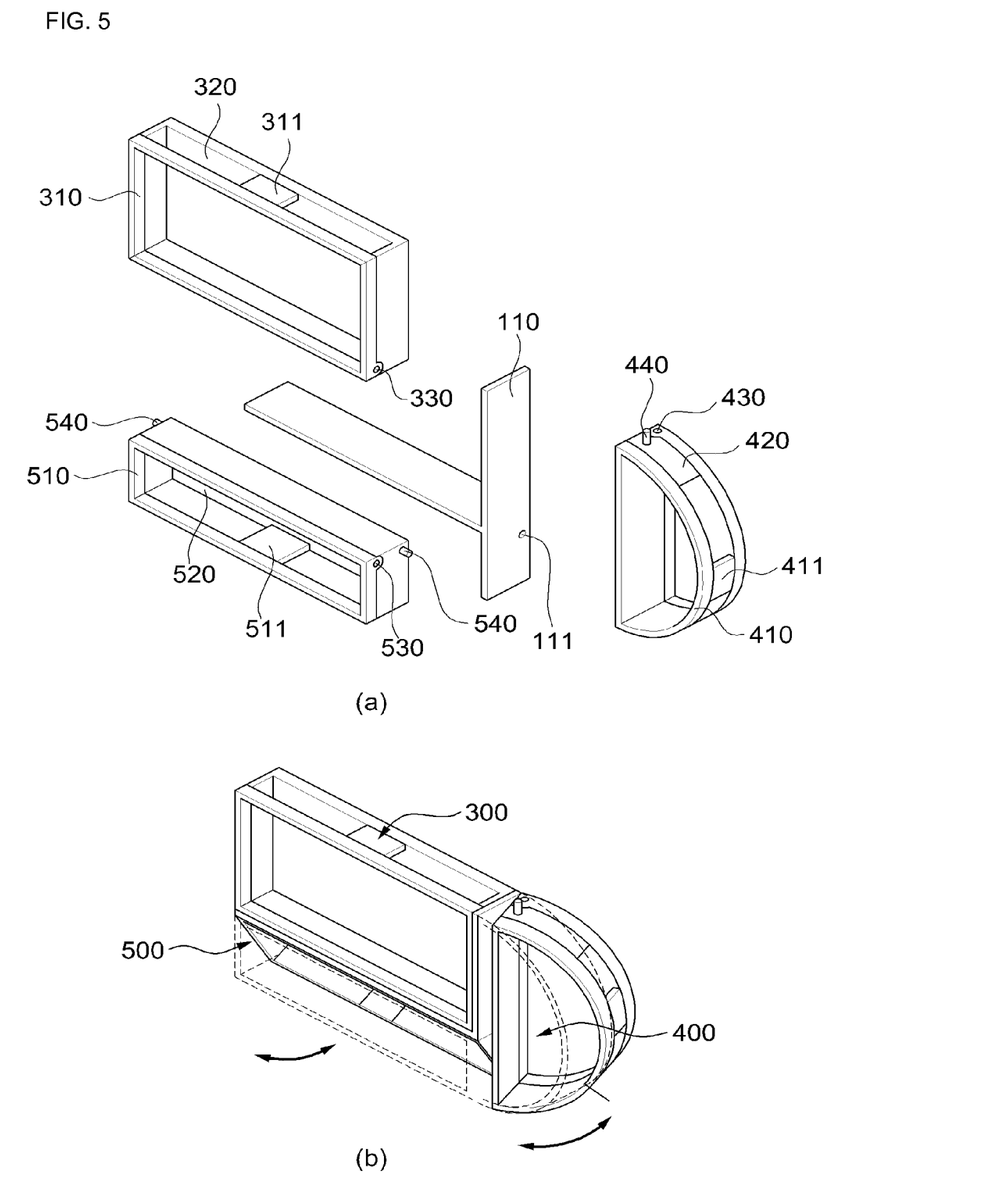
FIG. 5 shows views illustrating the structure of the inside of a sectionalized and detachable side view mirror assembly for a vehicle, according to a second exemplary embodiment of the present invention.
Figure 6:
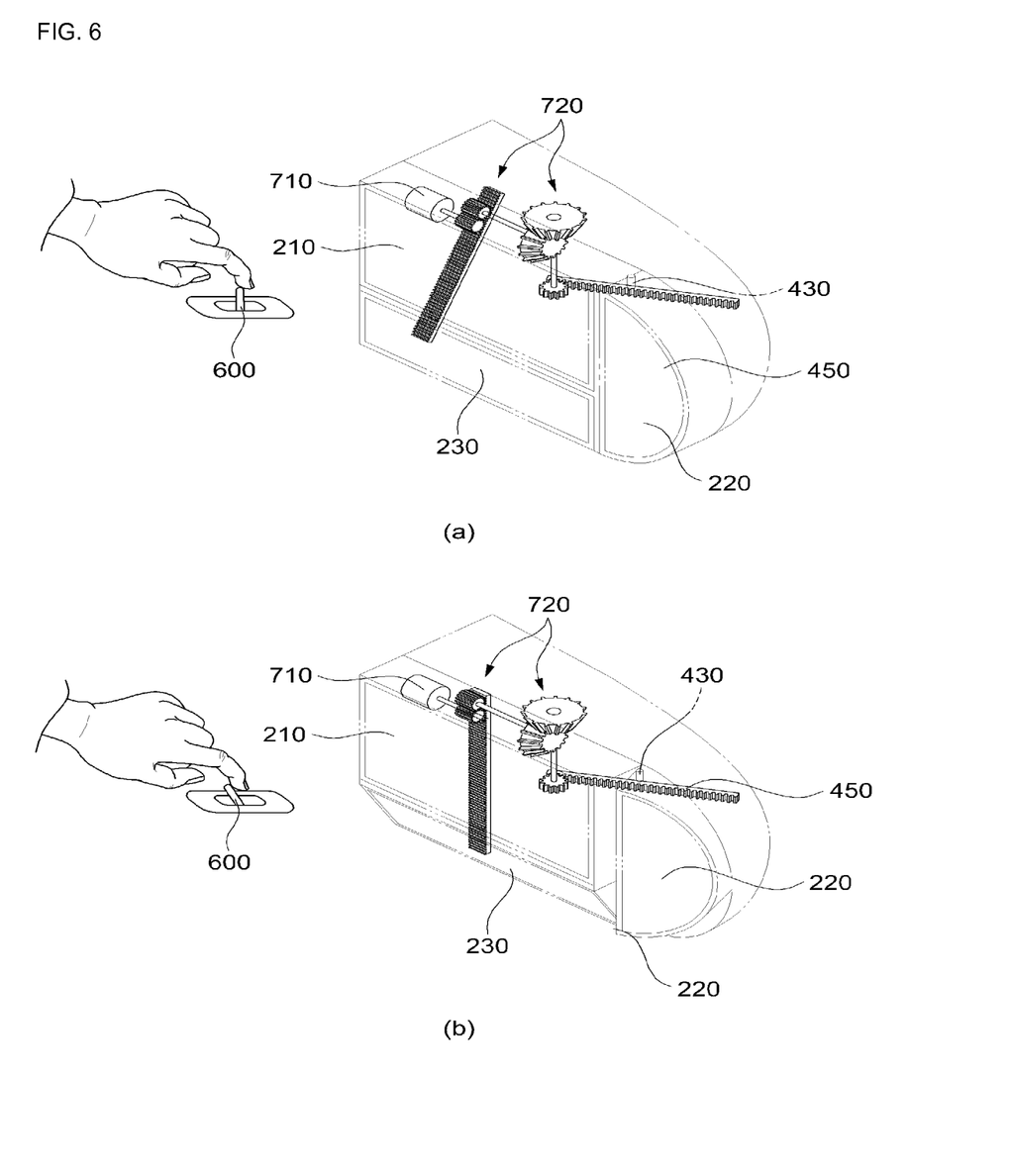
FIG. 6 shows views illustrating the structure and the operation principle of an actuator according to a second exemplary embodiment of the present invention.

FIG. 4 shows views illustrating the angle adjustment of a three-part side view mirror assembly from the inside, according to a second exemplary embodiment of the present invention. FIG. 5 shows views illustrating the structure of the inside of a sectionalized and detachable side view mirror assembly for a vehicle, according to a second exemplary embodiment of the present invention. FIG. 6 shows views illustrating the structure and the operation principle of an actuator according to a second exemplary embodiment of the present invention.

In the first exemplary embodiment of the present invention, the mirror mounting parts 300, 400, and 500 are integrally fabricated so that the angles between the mirrors 210, 220, and 230 are fixed, while in the second exemplary embodiment of the present invention, the angles between the mirrors 210, 220, and 230 are electromotively adjusted.

Referring to FIG. 4a, the central mirror 210, the lateral mirror 220, and the lower mirror 230 are on the same plane. In other words, the mirrors form angles of 180° therebetween. Meanwhile, referring to FIG. 4b, when the driver operates an indoor remote control 600, the central mirror 210 remains as it is, the lateral mirror 220 is inclined toward the back of the vehicle, and the lower mirror 230 is inclined toward the inside of the housing 100.

Meanwhile, referring to FIG. 4b, when the driver reversely operates the indoor remote control 600 in a state where the lateral mirror 220 and the lower mirror 230 are inclined at predetermined angles, the inclined angles of the mirrors 220 and 230 are unfolded so that the central mirror 210, the lateral mirror 220, and the lower mirror 230 are placed on the same plane as shown in FIG. 4a.

Herein, an important thing is that the lateral mirror 220, and the lower mirror 230 are simultaneously inclined with predetermined angles by the single operation of the indoor remote control 600, in which the mirrors are inclined in opposite directions. In other words, the angle formed by the lateral mirror 220 and the central mirror 210 is lower than 180° while the angle formed by the lower mirror 230 and the central mirror 210 is higher than 180°.

Meanwhile, although the indoor remote control 600 is shown as a stick-type remote control moving in left and right directions in FIG. 4, it may be fabricated as a one-touch button type remote control. In the button type remote control, when a button is pressed once, the mirrors may be inclined as shown in FIG. 4b, and when the button is pressed again, the mirrors may be returned to their original positions as shown in FIG. 4a.

Accordingly, the driver, who usually drives in a state where the three mirrors 210, 220, and 230 integrally form one flat mirror as shown in FIG. 4a, may adjust the angles of the lateral mirror 220 and the lower mirror 230 to be an angle appropriate for driving by only a single operation as shown in FIG. 4b at any time when he wants to watch the blind spot or determines that the adjustment is required for reasons of backward movement, or the like.

In FIG. 5 showing the configuration of the central mirror mounting part 300, the lateral mirror mounting part 400, and the lower mirror mounting part 500, the lateral mirror mounting part 400, and the lower mirror mounting part 500, which rotate at predetermined angles, except for the central mirror mounting part 300 inserted and fixed into the housing 100, include rotation shafts 440, and 540, respectively.

Meanwhile, within the housing 100, a sheet-type vertical panel 110 crossing the hollow section is provided. In the example of the right side view mirror assembly shown in FIG. 5, the central mirror mounting part 300 is provided and fixed in the upper portion of the left space of the vertical panel 110. Also, in the lower mirror mounting part 500, the rotation shafts 540 formed at the upper ends of the left and right lateral surfaces of the lower mirror mounting part 500 are fixed to the inner lateral surface at the left side of the housing 100 and to the vertical panel 110, respectively, so that the lower mirror mounting part 500 can rotate on the rotation shaft as shown in FIG. 5b. The rotation shaft 540 is fixed by inserting both ends of the rotation shaft 540 by a predetermined length into a rotation shaft insertion hole (not shown) of the inner lateral surface of the housing 100, and into a rotation shaft insertion hole 111 of the vertical panel 110.

The lateral mirror mounting part 400 is formed with the rotation shaft 440 at the right side end of the upper and lower surfaces thereof, and thus is fixed to the upper and lower surfaces at the inside of the housing and can rotate on the rotation shaft. The rotation shaft 440 is fixed by inserting both ends of the rotation shaft 440 by a predetermined length into rotation shaft insertion holes (not shown) in the upper and lower surfaces at the inside of the housing 100.

Referring to FIG. 6, an actuator 700 includes a motor 710 operated by the indoor remote control 600, and a gear box 720 transferring the rotary motion of the motor, which are mounted at the back of the mirror mounting parts 300, 400, and 500 within the housing 100.

The lower mirror mounting part 500 has a spur gear 550 extending to its rear lower side. In the example shown in FIG. 5, when the motor 710 rotates counterclockwise, the lower mirror mounting part 500 draws the rear lower portion due to the spur gear 550 connected to the gear box 720. Thus, as shown in FIG. 6b, the lower mirror mounting part 500 is inclined toward the inside of the housing 100 with a predetermined angle.

Meanwhile, the lateral mirror mounting part 400 has a spur gear 450 extending to its rear left side. As described above, when the motor 710 rotates counterclockwise, the lateral mirror mounting part 400 pushes the rear left portion due to the spur gear 450. Thus, as shown in FIG. 5b, the lateral mirror mounting part 400 is inclined toward the back of the vehicle with a predetermined angle.

Accordingly, by only a single operation of the indoor remote control 600, the lateral mirror 220 and the lower mirror 230 are simultaneously inclined with predetermined angles in opposite directions, or are reversely unfolded.

Furthermore, by only a single operation of the indoor remote control 600, the lateral mirrors 220 and the lower mirrors 230 included in a pair of right and left side view mirror assemblies may be simultaneously inclined with predetermined angles in opposite directions, or may be reversely unfolded. Of course, since the angles between the driver and the left/right side view mirror assemblies are different from each other, the angles of the left side view mirror assembly and the right side view mirror assembly have to be separately adjusted. However, the angles formed by the central mirror 210, the lateral mirror 220, and the lower mirror 230 may be adjusted to be the same angles for both the right side view mirror assembly and the left side view mirror assembly, thereby achieving the convenience in operation.

In the above description, the shape of the lateral mirror is semicircular. However, herein, the semicircular shape does not necessarily indicate a shape formed by geometrically halving a circle, and may be any shape as long as it is a figure having a straight line at one side and one round curved line joining one end of the straight line to the other end.

Industrial Applicability

Although several exemplary embodiments of the present invention have been described for illustrative purposes, it is understood that the present invention is not limited to these embodiments. Those skilled in the art will appreciate that various modifications, additions and substitutions are possible, without departing from the scope and spirit of the invention as disclosed in the accompanying claims.

The invention claimed is:

1. A sectionalized and detachable side view mirror assembly for a vehicle, the sectionalized and detachable side view mirror assembly comprising:

a housing having a hollow section therewithin;
a central mirror by which a driver sees the rear side of the vehicle from inside of the vehicle;
a lateral mirror by which the driver sees a blind spot in vicinity of the rear side of the vehicle from the inside of the vehicle;
a lower mirror by which the driver sees a lower rear side of the vehicle from the inside of the vehicle;
a central mirror mounting part for securing the central mirror within the hollow section of the housing;
a lateral mirror mounting part for securing the lateral mirror within the hollow section of the housing; and
a lower mirror mounting part for securing the lower mirror within the hollow section of the housing,
wherein the central mirror mounting part, the lateral mirror mounting part, and the lower mirror mounting part are integrally formed and insertedly provided in such a manner that the central mirror mounting part, the lateral mirror mounting part, and the lower mirror mounting part cover the hollow section of the housing,
the lateral mirror mounting part is positioned at a lateral side of the central mirror mounting part away from the vehicle, and is inclined with a predetermined angle toward outside of the housing along an outward direction of the vehicle, and
the lower mirror mounting part is positioned below the central mirror mounting part, and is inclined with a predetermined angle toward inside of the housing along a downward direction,
wherein an angle formed by the lateral mirror mounting part and the central mirror mounting part ranges from 183° to 185°, an angle formed by the lower mirror mounting part and the central mirror mounting part ranges from 175° to 177°, a length ratio of the central mirror to the lower mirror ranges from 7:3 to 8:2, and a width ratio of the central mirror to the lateral mirror ranges from 7:3 to 8:2.

2. A sectionalized and detachable side view mirror assembly for a vehicle, the sectionalized and detachable side view mirror assembly comprising:
a housing having a hollow section therewithin;
a central mirror by which a driver sees the rear side of the vehicle from inside of the vehicle;
a lateral mirror by which the driver sees a blind spot in vicinity of the rear side of the vehicle from the inside of the vehicle;
a lower mirror by which the driver sees a lower rear side of the vehicle from the inside of the vehicle;
a central mirror mounting part for securing the central mirror within the hollow section of the housing;
a lateral mirror mounting part for securing the lateral mirror within the hollow section of the housing; and
a lower mirror mounting part for securing the lower mirror within the hollow section of the housing,
wherein the central mirror mounting part, the lateral mirror mounting part, and the lower mirror mounting part are integrally formed and insertedly provided in such a manner that the central mirror mounting part, the lateral mirror mounting part, and the lower mirror mounting part cover the hollow section of the housing,
the lateral mirror mounting part is positioned at a lateral side of the central mirror mounting part away from the vehicle, and is inclined with a predetermined angle toward outside of the housing along an outward direction of the vehicle, and
the lower mirror mounting part is positioned below the central mirror mounting part, and is inclined with a predetermined angle toward inside of the housing along a downward direction,
wherein the central mirror mounting part comprises a front-side frame, a back panel, and a hinge, wherein the front-side frame has a rectangular opening allowing the central mirror to be exposed to outside, the back panel is fixed within the housing, and has a space between the back panel and the front-side frame to allow the central mirror to be inserted therein, and the hinge is formed at one side end of the front-side frame and the back panel, connects the front-side frame and the back panel to each other, and allows the front-side frame to rotate with a predetermined angle, wherein at one end of the front-side frame, a fastening protrusion is formed which is fastened with the back panel by being forcedly fitted, at a corresponding position of the back panel, a fastening groove fastened with the fastening protrusion is formed to forcedly hold the central mirror inserted within the space through fastening, and a front surface of the front-side frame is coated with a reflective material,
the lateral mirror mounting part comprises a front-side frame, a back panel, and a hinge, wherein the front-side frame has a semicircular opening allowing the lateral mirror to be exposed to the outside, the back panel is fixed within the housing, and has a space between the back panel and the front-side frame to allow the lateral mirror to be inserted therein, and the hinge is formed at one side end of the front-side frame and the back panel, connects the front-side frame and the back panel to each other, and allows the front-side frame to rotate with a predetermined angle, wherein at one end of the front-side frame, a fastening protrusion is formed which is fastened with the back panel by being forcedly fitted, at a corresponding position of the back panel, a fastening groove fastened with the fastening protrusion is formed to forcedly hold the lateral mirror inserted within the space through fastening, and a front surface of the front-side frame is coated with a reflective material, and
the lower mirror mounting part comprises a front-side frame, a back panel, and a hinge, wherein the front-side frame has a rectangular opening allowing the lower mirror to be exposed to the outside, the back panel is fixed within the housing, and has a space between the back panel and the front-side frame to allow the lower mirror to be inserted therein, and the hinge is formed at one side end of the front-side frame and the back panel, connects the front-side frame and the back panel to each other, and allows the front-side frame to rotate with a predetermined angle, wherein at one end of the front-side frame, a fastening protrusion is formed which is fastened with the back panel by being forcedly fitted, at a corresponding position of the back panel, a fastening groove fastened with the fastening protrusion is formed to forcedly hold the lower mirror inserted within the space through fastening, and a front surface of the front-side frame is coated with a reflective material.

3. The sectionalized and detachable side view mirror assembly for the vehicle as claimed in claim 2, wherein spaces corresponding to twice thicknesses of the central mirror, the lateral mirror, and the lower mirror are formed between the front-side frame and the back panel of the central mirror mounting part, the front-side frame and the back panel of the lateral mirror mounting part, and the front-side frame and the back panel of the lower mirror mounting part, respectively, two overlapping central mirrors, two overlapping lateral mirrors, and two overlapping lower mirrors are inserted in the spaces, and then, the fastening protrusion and the fastening groove of the central mirror mounting part are fastened with each other to forcedly hold the two overlapping central mirrors, the fastening protrusion and the fastening groove of the lateral mirror mounting part are fastened with each other to forcedly hold the two overlapping lateral mirrors, and the fastening protrusion and the fastening groove of the lower mirror mounting part are fastened with each other to forcedly hold the two overlapping lower mirrors.

4. A sectionalized and detachable side view mirror assembly for a vehicle, the sectionalized and detachable side view mirror assembly comprising:

a housing having a hollow section therewithin, the hollow section being divided into two parts by a sheet-type vertical panel in a vertical direction;

a rectangular central mirror;

a semicircular lateral mirror;

a rectangular lower mirror;

a central mirror mounting part for securing the central mirror within the hollow section of the housing;

a lateral mirror mounting part for securing the lateral mirror within the hollow section of the housing;

a lower mirror mounting part for securing the lower mirror within the hollow section of the housing; and an actuator for adjusting angles of the lateral mirror mounting part and the lower mirror mounting part, wherein the central mirror mounting part comprises a front-side frame, a back panel, and a hinge, wherein the front-side frame has a rectangular opening allowing the central mirror to be exposed to outside, the back panel is fixed within the housing, and has a space between the back panel and the front-side frame to allow the central mirror to be inserted therein, and the hinge is formed at one side end of the front-side frame and the back panel, connects the front-side frame and the back panel to each other, and allows the front-side frame to rotate with a predetermined angle, wherein at one end of the front-side frame, a fastening protrusion is formed which is fastened with the back panel by being forcedly fitted, at a corresponding position of the back panel, a fastening groove fastened with the fastening protrusion is formed to forcedly hold the central mirror inserted within the space through fastening, and a front surface of the front-side frame is coated with a reflective material, the lateral mirror mounting part comprises a front-side frame, a back panel, a hinge, and a spur gear, wherein the front-side frame has a semicircular opening allowing the lateral mirror to be exposed to the outside, the back panel has a space between the back panel and the front-side frame to allow the lateral mirror to be inserted therein, and the hinge is formed at one side end of the front-side frame and the back panel, connects the front-side frame and the back panel to each other, and allows the front-side frame to rotate with a predetermined angle, wherein at one end of the front-side frame, a fastening protrusion is formed which is fastened with the back panel by being forcedly fitted, at a corresponding position of the back panel, a fastening groove fastened with the fastening protrusion is formed to forcedly hold the lateral mirror inserted within the space through fastening, a front surface of the front-side frame is coated with a reflective material, at both lateral ends of the back panel, a rotation shaft is formed which is fixed to an inner surface of the housing and the vertical panel to rotate the back panel with a predetermined angle, and the spur gear is engaged with the actuator to adjust the angle of the back panel during motor-rotation of the actuator, the lower mirror mounting part comprises a front-side frame, a back panel, a hinge, and a spur gear, wherein the front-side frame has a rectangular opening allowing the lower mirror to be exposed to the outside, the back panel is fixed within the housing, and has a space between the back panel and the front-side frame to allow the lower mirror to be inserted therein, and the hinge is formed at one side end of the front-side frame and the back panel, connects the front-side frame and the back panel to each other, and allows the front-side frame to rotate with a predetermined angle, wherein at one end of the front-side frame, a fastening protrusion is formed which is fastened with the back panel by being forcedly fitted, at a corresponding position of the back panel, a fastening groove fastened with the fastening protrusion is formed to forcedly hold the lower mirror inserted within the space through fastening, a front surface of the front-side frame is coated with a reflective material, at both lateral ends of the back panel, a rotation shaft is formed which is fixed to inner upper and lower surfaces of the housing to rotate the back panel with a predetermined angle, and the spur gear is engaged with the actuator to adjust the angle of the back panel during the motor-rotation of the actuator, wherein the central mirror mounting part and the lower mirror mounting part are inserted in such a manner that the central mirror mounting part, and the lower mirror mounting part cover one side hollow section of the vertical panel within the housing, and the lower mirror mounting part is provided below the central mirror mounting part, the lateral mirror mounting part is inserted in such a manner that the lateral mirror mounting part covers the other side hollow section of the vertical panel within the housing, and both the spur gear of the lateral mirror mounting part and the spur gear of the lower mirror mounting part are engaged with the actuator to simultaneously adjust angles of the lateral mirror mounting part and the lower mirror mounting part during the motor-rotation of the actuator.

5. The sectionalized and detachable side view mirror assembly for the vehicle as claimed in claim 4, further comprising an indoor remote control for controlling the actuator, the indoor remote control being provided inside the vehicle, wherein the actuator comprises a motor and a gear box, wherein the motor is rotated in any one direction by an operation of the indoor remote control, and the gear box is connected to said spur gears to transfer rotary motion of the motor, which allows the spur gear of the lateral mirror mounting part and the spur gear of the lower mirror mounting part to move in opposite directions during rotation of the motor, when the motor rotates in one direction, the lateral mirror mounting part is inclined with a predetermined angle toward outside of the housing along an outward direction of the vehicle, and the lower mirror mounting part is inclined with a predetermined angle toward inside of the housing along a downward direction, and when the motor rotates in the other direction, inclined angles of the lateral mirror mounting part and the lower mirror mounting part are unfolded so as to allow the lateral mirror mounting part and the lower mirror mounting part to be on the same plane as the central mirror mounting part.

\* \* \* \* \*